United States Patent
Shi et al.

(10) Patent No.: US 11,182,710 B2
(45) Date of Patent: Nov. 23, 2021

(54) PREDICTIVE DATA OBJECTS

(71) Applicant: Palantir Technologies Inc., Palo Alto, CA (US)

(72) Inventors: Dayang Shi, New York, NY (US); Kirat Singh, London (GB); Marie Kindblom, London (GB); Michael Weisz, London (GB)

(73) Assignee: Palantir Technologies Inc., Denver, CO (US)

( * ) Notice: Subject to any disclaimer, the term of this patent is extended or adjusted under 35 U.S.C. 154(b) by 76 days.

(21) Appl. No.: 16/689,724

(22) Filed: Nov. 20, 2019

(65) Prior Publication Data

US 2021/0004742 A1     Jan. 7, 2021

Related U.S. Application Data

(60) Provisional application No. 62/869,238, filed on Jul. 1, 2019.

(51) Int. Cl.
*G06Q 10/06* (2012.01)
*G06F 3/0482* (2013.01)
*G06K 9/62* (2006.01)

(52) U.S. Cl.
CPC ..... *G06Q 10/06312* (2013.01); *G06F 3/0482* (2013.01); *G06K 9/6293* (2013.01); *G06Q 10/06315* (2013.01)

(58) Field of Classification Search
CPC ........... G06Q 10/00–50/00; G06F 1/00–40/00; G06K 1/00–21/00
USPC .............................................. 705/7.11–7.42
See application file for complete search history.

(56) References Cited

U.S. PATENT DOCUMENTS

| | | | | |
|---|---|---|---|---|
| 6,738,748 | B2 * | 5/2004 | Wetzer | G06Q 10/1097 705/7.21 |
| 10,699,248 | B2 * | 6/2020 | Tamura | F24F 11/38 |
| 2002/0143421 | A1 * | 10/2002 | Wetzer | G06Q 10/06314 700/100 |

(Continued)

FOREIGN PATENT DOCUMENTS

| | | |
|---|---|---|
| EP | 3258426 | 12/2017 |
| EP | 3761240 | 1/2021 |
| GB | 2557864 | 7/2018 |

OTHER PUBLICATIONS

Official Communication for European Patent Application No. 19210393.5 dated Jan. 21, 2020.

*Primary Examiner* — Alan S Miller
(74) *Attorney, Agent, or Firm* — Knobbe, Martens, Olson & Bear, LLP

(57) ABSTRACT

A computing system accesses one or more data sources to determine maintenance optimization data associated with an asset within a set of assets. The maintenance optimization data may include one or more of: upcoming maintenance events for the asset, such as may be predicted based on analysis of historical maintenance information of the asset, a time series of predicted value of the asset over a time period around the upcoming maintenance event, such as within a few days or hours of the maintenance event, and/or a recommended window of time to initiate and/or perform upcoming maintenance events, which may be based on a combination of the expected upcoming maintenance events, and the time series of predicted value of the particular asset, for example.

18 Claims, 11 Drawing Sheets

(56) References Cited

U.S. PATENT DOCUMENTS

| | | | | |
|---|---|---|---|---|
| 2002/0152305 | A1* | 10/2002 | Jackson | H04L 41/509 709/224 |
| 2002/0184178 | A1* | 12/2002 | Tasooji | G06N 5/04 706/50 |
| 2003/0055666 | A1* | 3/2003 | Roddy | G06Q 10/06395 705/305 |
| 2003/0187865 | A1* | 10/2003 | Frisina | G05B 19/41865 |
| 2004/0204775 | A1* | 10/2004 | Keyes | G06Q 10/06 700/29 |
| 2005/0055239 | A1* | 3/2005 | Farmer | G06Q 30/0601 705/7.11 |
| 2005/0091176 | A1* | 4/2005 | Nishiuma | G06Q 10/04 706/45 |
| 2006/0101400 | A1* | 5/2006 | Capek | G06F 9/4843 717/120 |
| 2007/0043536 | A1* | 2/2007 | Tonack | G05B 23/0216 702/184 |
| 2008/0021604 | A1* | 1/2008 | Bouvier | G06Q 10/06 701/29.5 |
| 2008/0177613 | A1* | 7/2008 | Chan | G06Q 10/0631 705/7.12 |
| 2008/0288321 | A1* | 11/2008 | Dillon | G06Q 10/06311 705/7.13 |
| 2009/0132321 | A1* | 5/2009 | Kamisuwa | G06Q 10/06313 705/7.22 |
| 2011/0029824 | A1* | 2/2011 | Scholer | G05B 23/0224 714/47.3 |
| 2014/0058534 | A1* | 2/2014 | Tiwari | G05B 13/04 700/9 |
| 2014/0101058 | A1* | 4/2014 | Castel | G06Q 10/109 705/305 |
| 2015/0003847 | A1* | 1/2015 | Yang | G03G 15/556 399/27 |
| 2015/0212808 | A1* | 7/2015 | Mandava | G06F 9/48 717/168 |
| 2015/0220875 | A1* | 8/2015 | Tamaki | G06Q 10/087 705/7.23 |
| 2015/0227838 | A1* | 8/2015 | Wang | G06N 7/00 706/12 |
| 2015/0286994 | A1* | 10/2015 | Elder | G06Q 10/20 705/305 |
| 2015/0317197 | A1* | 11/2015 | Blair | H04L 41/147 714/47.3 |
| 2016/0133066 | A1 | 5/2016 | Lavie | |
| 2016/0140263 | A1* | 5/2016 | Rojas | G05B 23/02 703/18 |
| 2019/0156226 | A1* | 5/2019 | Ouyang | G06N 5/045 |
| 2020/0371858 | A1* | 11/2020 | Hayakawa | G06Q 10/04 |

* cited by examiner

FIG. 9

PREDICTIVE DATA OBJECTS

TECHNICAL FIELD

The present disclosure relates to sensors, user interfaces, and workflows for monitoring activity of assets and generating predictive intelligence of future events associated with those assets, such as expected maintenance.

BACKGROUND

A data system may include multiple types of data, spread across numerous data stores and/or databases, each of which may comprise data in different formats. Some of that data may include data related to geographically dispersed assets, including, for example, geographic locations of those assets, fluctuating/dynamic value of those assets, maintenance information related to the assets, and/or the like. For various reasons, it may be desirable or needed to maintain the geographically dispersed assets.

SUMMARY

Due to the disparate data stores, databases, and formats, of sensor data from assets, a data system may not be capable of enabling a holistic evaluation and analysis of the data to determine efficient maintenance of the geographically dispersed assets. Thus, as discussed further below, a data analysis system is configured to access data from and/or associated with disparate assets, data sources, databases, etc., and enable generation of a holistic evaluation and analysis system, such as may be used to determine efficient maintenance of the geographically dispersed assets.

In view of the large number of variables associated with assets, and the variables' effects on one another, evaluating maintenance options associated with a set of assets can create an exponentially complicated problem. Thus, the data analysis system discussed herein addresses this technical challenge by, for example, providing analysis of individual assets that is affected by other assets.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) *User Interface Design*. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In one example method, performed by a computing system having one or more hardware computer processors and one or more non-transitory computer readable storage device storing software instructions executable by the computing system to perform the computerized method comprising: accessing historical maintenance information related to an asset, accessing dynamic asset value information related to the asset, accessing a predicted utilization of the asset for a period of time, determining, based on the historical maintenance information, an expected upcoming maintenance event for the asset within the period of time, determining, based on the dynamic asset value information and the predicted utilization of the asset for the period of time, a time series of predicted value of the asset over the period of time, and determining, based on the time series of predicted value of the asset over the period of time, a recommended window of time for performing the expected upcoming maintenance event.

Additional example implementations may include one or more of the following features. The computerized method where the predicted utilization is based on expected values of an input to the asset over the period of time. The dynamic asset value information includes a dynamic value model and the predicted utilization is further based on evaluation of the expected values of the input to the asset by the dynamic value model. The historical maintenance information includes one or more documents in an image format, the method may include: performing character recognition of the one or more documents; and parsing information in the one or more documents to identify maintenance events. The computerized method may include: for each identified maintenance event, generating a maintenance event object. The computerized method may include: identifying two or more related maintenance events; and determining one or more of: an interval between the related maintenance events; one or more asset types impacted by the maintenance events; and an average time for completion of the maintenance events. The computerized method may include: generating the dynamic asset value information based on sensor data from one or more sensors on the asset. The dynamic asset value information indicates variance in a performance metric of the asset based on an input value. The performance metric is an output quantity or rate of the asset. A second performance metric is a value of the asset that is determined based at least on the output quantity or rate of the asset. The recommended window of time is large enough to accommodate the expected upcoming maintenance event based on average time for completion of similar maintenance events in the historical maintenance information. The recommended window of time is during a lowest predicted value of the asset. The recommended window of time is during less preferred times. The computerized method may include: generating user interface data renderable to display an interactive graphical user interface including a time series graph representative of the determined time series of predicted value. The interactive graphical user interface is configured to receive an input from a user selecting a portion of the time series graph, and the method further may include scheduling the maintenance event at a time associated with the selected portion of the time series graph. The computerized method may include: generating user interface data renderable to display an interactive graphical user interface including the recommended window of time and a user interface control usable by a user to adjust the recommended window of time. Implementations of the described techniques may include hardware, a method or process, or computer software on a computer-accessible medium.

Another example implementation may include a computing system comprising a hardware computer processor, a non-transitory computer readable medium having software instructions stored thereon, the software instructions executable by the hardware computer processor to cause the computing system to perform operations including: accessing historical maintenance information related to an asset, accessing dynamic asset value information related to the asset, accessing a predicted utilization of the asset for a period of time, determining, based on the historical maintenance information, an expected upcoming maintenance event for the asset within the period of time, determining, based on the dynamic asset value information and the predicted utilization of the asset for the period of time, a time series of predicted value of the asset over the period of time, and determining, based on the time series of predicted value of the asset over the period of time, a recommended window of time for performing the expected upcoming maintenance event. Other embodiments of this aspect include corresponding computer systems, apparatus, and computer programs recorded on one or more computer storage devices, each configured to perform the actions of the methods.

Additional example implementations may include one or more of the following features. The computing system where the predicted utilization is based on expected values of an input to the asset over the period of time. The dynamic asset value information includes a dynamic value model and the predicted utilization is further based on evaluation of the expected values of the input to the asset by the dynamic value model. A second performance metric is a value of the asset that is determined based at least on the output quantity or rate of the asset. Implementations of the described techniques may include hardware, a method or process, or computer software on a computer-accessible medium.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 9 is a value comparison user interface that includes an interactive graphical user interface including a cell-based grid, where each cell of the grid indicates, for each asset, and for each day over a period of days (or other time period), a value capacity of the assets.

DETAILED DESCRIPTION

Terms

Figure 1:
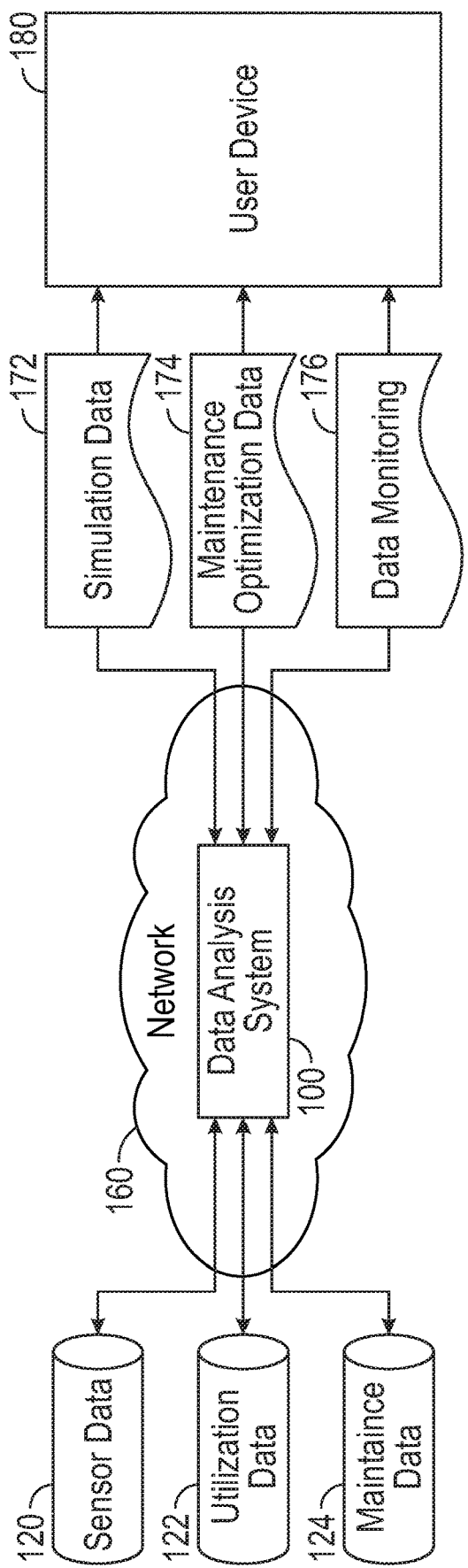
FIG. 1 is a block diagram illustrating one embodiment of a data analysis system in communication with various data sources and providing various output data to a user device.

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Asset: A physical object, particularly a mechanical or electro-mechanical machine or electrical apparatus, of some value to an entity. Assets may be stationary or mobile objects. Assets may be part of a set or system, such as a communication, transportation, or power generation system. For example, assets of a communication system may include thousands of assets such as radio towers spread across a diverse geographic area. Each asset may be associated with one or more sensors that determines various attributes of the asset, such as temperature, speed, direction, humidity, light, vibration, sound, and the like. Assets can fail (cease functioning) or malfunction (cease functioning correctly). Failure or malfunction of an asset may cause failure in, malfunction of or damage to other assets. Maintenance or replacement of an asset before it fails or malfunctions is in most instances better than maintenance or replacement of an asset after it fails or malfunctions.

Asset Value: a measure of the importance or significance of an asset to performance of the system in which the asset is included. The importance or significance of the asset may be related to the role that the asset plays when the system is fully operational. It may additionally or alternatively be related to the importance or significance of the asset should the asset fail or malfunction, in terms of the consequences on the operation of the system and/or the time, effort etc. of repairing the system in the event of malfunction or failure. The asset value may involve an aspect of a measure of output/productivity of the asset or part of the system that is dependent upon the asset. In some implementations, asset value includes a monetary value, such as a dollar amount representation of value that is associated with an asset. Thus, the measure of importance or significance of an asset may be a monetary value.

Data Object or Object: A data container for information representing specific things in the world that have a number of definable properties. For example, a data object can represent an asset, a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., asset, person, event, or document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Application Programming Interfaces (APIs): an API is generally a defined communication channel, protocol, settings, etc. that allows two devices to exchange information between one another in a more direct manner than might otherwise be possible. In some embodiments, an API registration module may be configured to register individual devices (e.g. computing devices, Internet of things devices, sensors, etc.) for communication with a particular computing device (e.g., a central server that receives, processes, stores, provides, information to the individual devices) by issuing a token to the individual devices that authorizes such direct communications. Thus, a computing system may establish secure and direct communication channels with multiple devices via APIs.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example System

FIG. 1 is a block diagram illustrating one embodiment of a data analysis system 100 in communication with various data sources 120, 122, 124, and providing various output data to a user device 180. The data analysis system 100 may include one or more computing devices, such as servers, virtual processors, personal computers, or any other combination of one or more computing devices that perform methods discussed herein. Similarly, the user device 180 may include one or more computing devices. In some embodiments, the analysis software discussed herein is entirely or primarily executed by the data analysis system 100, with data necessary for interacting with a user on the user device 180 transmitted to the user device. In other embodiments, certain of the analysis software is executed on the user device 180 and other portions of the analysis software are executed on the data analysis system 100. In one embodiment, each on a of the data sources is separately maintained, such as by different entities, while in other embodiments two or more of the data sources may be maintained by an individual entity.

As will be discussed in further detail below, FIG. 1 illustrates that the data analysis system 100 may access various types of data, such as sensor data 120, value data 122, and maintenance data 124. In general, the sensor data 120 stores asset data from a plurality of assets, such as from each of multiple assets within an asset system. For example, in a communication system, sensor data 120 may store asset data for thousands of radio towers of the communication system. The sensor data 120 may include information such bandwidth utilization, power consumption, data speed, etc. for the corresponding radio tower. In general, the value data 122 includes information that allows calculation of expected value of an asset based on value information of other similar assets and/or historical value information of the asset. For example, a value model for a particular asset (e.g., a particular type, model, size, year, etc. of asset) may be usable to calculate an expected output of the asset relative to an input of the asset, where the output of the asset is indicative of value of the asset. Value of different assets may be based on different performance metric(s) of the particular asset and, thus, may vary from one type of asset to another. For example, value of some assets may be based on output quantity per unit time (e.g., number of passengers serviced by a transportation hub of a transportation system, data transfer speed in a communication system, power generated per hour, etc.), and/or any other characteristics of assets that varies and is indicative of value of the asset. Maintenance data 124 generally includes information regarding maintenance of assets, such as historical repairs, replacements, services provided, etc., and/or related data such as time that the asset is out of service.

Other types of data relevant to the analysis performed by the data analysis system 100 may also be accessible. The example data analysis system 100 may provide outputs to the user device 180, such as based on analysis performed on the various input data, indicating information such as simulation data 172, maintenance optimization data 174, and/or value analysis data 176, which are discussed in further detail below. Other types of analysis, information, summaries, recommendations, etc. may be provided by the data analysis system in other embodiments.

Predictive Maintenance Recommendations

With reference to the example of FIG. 1, the data analysis system 100 may execute analysis software configured to combine and analyze data from multiple assets, such as assets at diverse geographical locations, to enable generation of useful and efficient predictive maintenance recommendations for the geographically dispersed assets. A collection or set of assets, each having one or more sensors that provides sensor data indicative of operation of the assets (e.g., sensor data 120), may be associated with a transportation infrastructure or network, a communications infrastructure or network, a power generation infrastructure or network, or any other type of infrastructure or network.

Predictive maintenance recommendations may be used to reduce the likely severity of a fault which may be experienced by an asset. In this way, decisions relating to preventative maintenance can be placed on a quantitative footing and the rate of failure of assets in use can be reduced, in order to increase output, but without requiring the performance of excessive preventative maintenance.

In one embodiment, the data analysis system 100 obtains various types of data, such as (1) maintenance data 124 that may include historical maintenance information related to the assets (which historical maintenance information may be parsed or extracted from a first data format, such as a PDF format); (2) value data 122 that may include dynamic asset value information related to the assets, such as value curves, power output curves, etc., and/or (3) sensor data 120 that may include actual, forecasted, and/or predicted sensor values, inputs and/or utilization levels of the assets (which may be accessed, e.g., via one or more API calls). In other embodiments, fewer or additional types of data may be accessed by a data analysis system.

The accessed data, such as sensor data 120, value data 122, and/or maintenance data 124, may then be analyzed by the data analysis system 100 to determine, for a particular asset, maintenance optimization data 174 indicating one or more recommended windows of time to initiate and/or perform one or more maintenance events, such as to reduce risk of partial or complete failure of the asset. This maintenance optimization data 174 may include one or more of:

Upcoming maintenance events for the particular asset, such as may be predicted based on analysis of historical maintenance information of the asset.

A time series of predicted value of the asset over a time period around the upcoming maintenance event, such as within a few days or hours of the maintenance event. This time series may be based on a combination of the dynamic asset value information for the particular asset, and the forecasted or predicted value of the particular asset as future times.

One or more recommended windows of time to initiate and/or perform one or more maintenance events, which may be based on a combination of the expected upcoming maintenance events, and the time series of predicted value of the particular asset.

The data analysis system 100 may provide recommended time slot(s) to initiate one or more maintenance events in an interactive graphical user interface, which may include a time series chart indicating recommended times to initiate the one or more maintenance events, and less optimal times to initiate the one or more maintenance events. Accordingly, the data analysis system 100 can enable efficient solutions to the complex problem of predictive maintenance of geographically dispersed assets, using data from potentially disparate data sources.

In some embodiments, maintenance data 124 may be in a graphical format, such as a portable document format (PDF) or image file (e.g., JPEG, GIF, PNG, etc.). In such embodiments, the data analysis system 100 may include a recognition engine configured to perform optical character recognition of the graphical format maintenance data. The information recognized in the graphical format document may then be stored as data objects and usable by the data analysis system. For example, in one embodiment a new data object may be created for each maintenance event that is recognized in accessed maintenance data for. Thus, each data object may include information, such as asset identification, date of service, type of service, time spent on service, parts used for service, etc., which may be stored as properties of the data objects, for a particular maintenance task. The data objects may be stored by the data analysis system 100 and/or in the maintenance data 124, such as in a linked arrangement with related objects. For example, in one embodiment each asset is associated with a unique data object that is linked to data objects representing maintenance events for that asset, and also linked to unique data objects of other assets within a set of assets (e.g., assets dispersed geographically within a transportation, communication, energy, etc. system).

Figure 2:
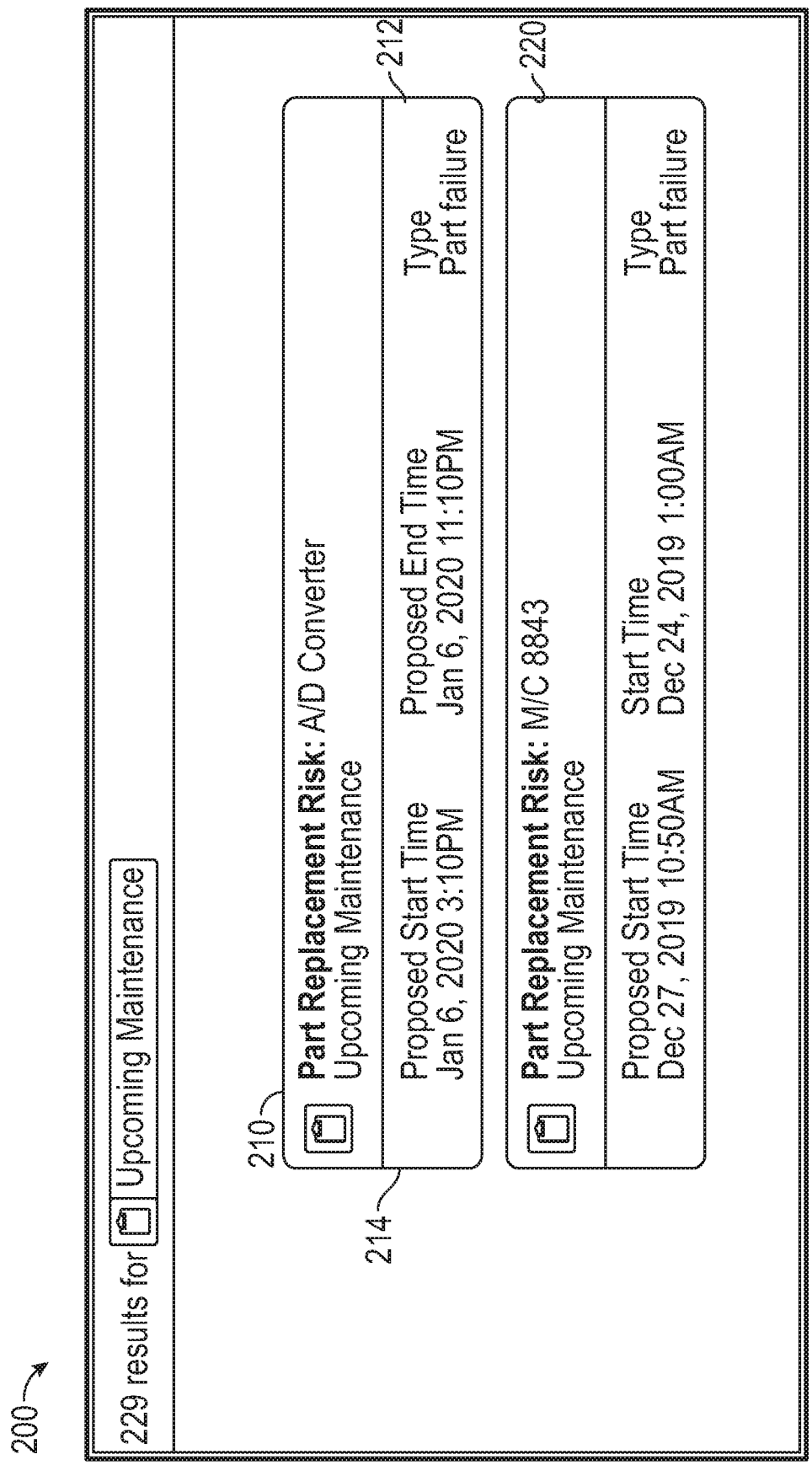
FIG. 2 is an example user interface that may be provided to a user to provide information regarding upcoming expected maintenance on particular assets within a set of assets.

FIG. 2 is an example user interface 200 that may be provided to a user to provide information regarding upcoming expected maintenance on particular assets within a set of assets. In this example, the upcoming maintenance interface 200 indicates that 229 possible maintenance events are upcoming (e.g., within a predefined time period, such as a week, month, or year). A time period associated with upcoming maintenance event may be selected by the user and/or may be automatically the user preferences, system preferences, number of maintenance events, data. In the example of FIG. 2, the user interface 200 illustrates details on two predicted maintenance events 210 and 220.

The data analysis system 100 analyzes historical maintenance data 124, such as from a particular asset and/or a particular set of assets with some characteristic in common with the particular asset (e.g., assets within a particular geographic area, having the same capacity, size, capability, etc., and/or assets within a set of assets). Based on the historical maintenance data, the data analysis system 100 may determine typical failure events (and/or associated maintenance events) for particular types or categories of assets and/or component or subsystem of assets. For example, the predictive maintenance event 210 for an A/D Converter may be based on analysis of maintenance data from a plurality of other A/D Converters located in a same circuit, facility, or other system that may be distantly located. For example, maintenance data associated with those other assets may be analyzed to determine expected timeframes for particular maintenance events. In the embodiment of FIG. 2, the particular maintenance risk 212 is indicated as a "part failure." In certain implementations, the maintenance risk may be indicated in further detail, such as identifying a particular make, model, year, type, location, etc. of the part that is expected to require maintenance at the indicated time. A proposed maintenance time 214 is provided, indicating an expected repair time of eight hours for the example proposed maintenance event 210.

In some embodiments, the analysis system 100 intelligently selects a proposed maintenance time that is earlier than an estimated time of failure or decreased production for the asset. For example, if the particular A/D Converter is expected to fail on Feb. 1, 2020, a proposed maintenance time may be provided in the month of December 2019 or January 2020. In some embodiments, the proposed maintenance time is optimized based on value of the asset at various times. Thus, if an asset for which a maintenance task is needed (in view of a predicted failure event) has a maximum value during the hours of 9 AM-2 PM, the scheduled maintenance may be selected outside of that timeframe. Similarly, the day of week may also be intelligently selected based on value of the asset, such as to minimize impact on value of the system due to the maintenance event. Additionally, other factors may be considered in scheduling a maintenance time for a proposed maintenance task, such as schedules of maintenance workers that are most qualified to perform a particular maintenance task, availability of parts, impact on other assets during the maintenance task, and/or other similar factors. In some embodiments, the analysis system provides multiple maintenance timeslots that best optimize the factors noted above, such as minimal reduction in value of the asset, and allow the user to select one of the timeslots.

Figure 3A:
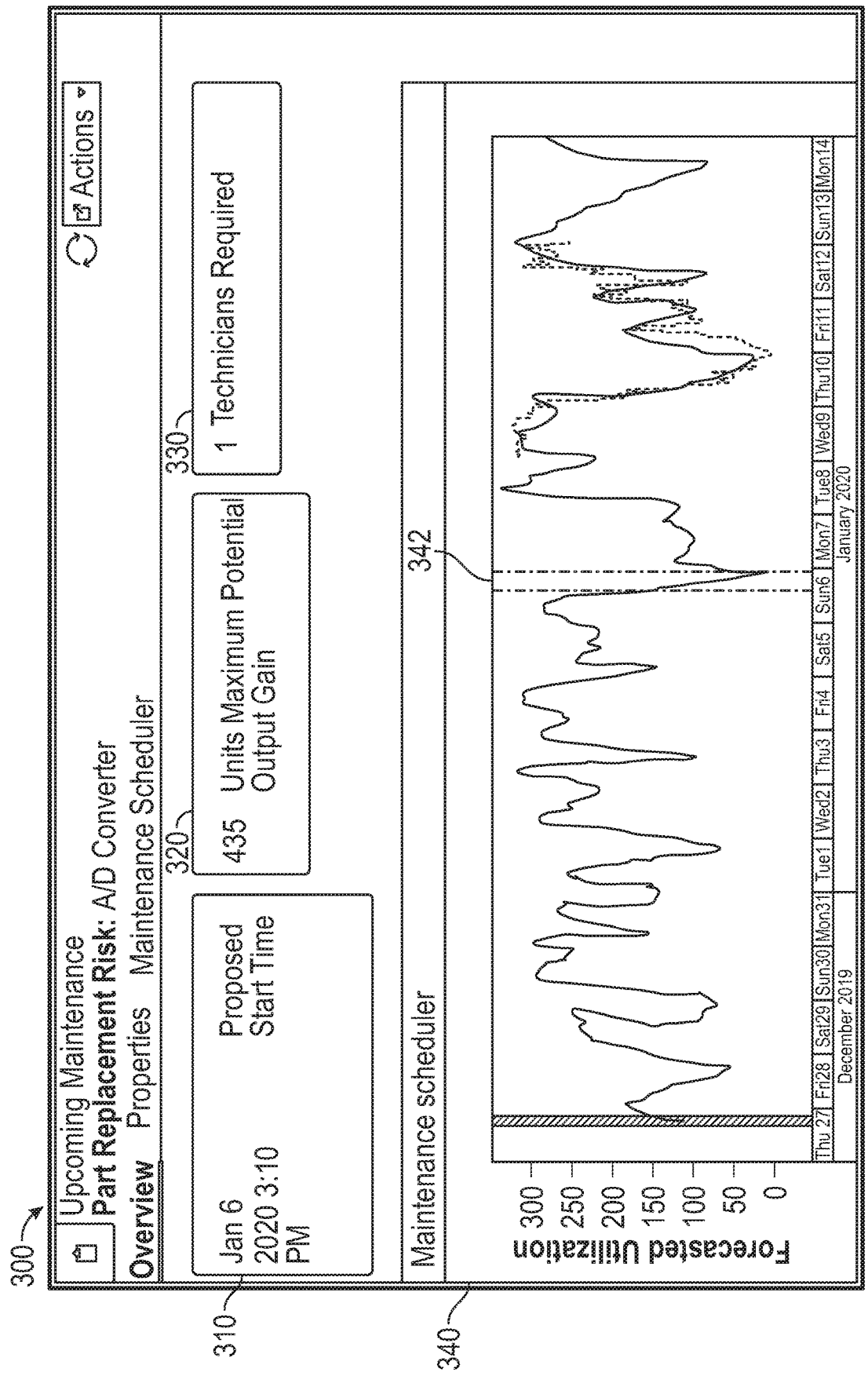
FIG. 3A is an example user interface that may be used in selecting and/or confirming a proposed maintenance time provided by the analysis system.

FIG. 3A is an example user interface 300 that may be used in selecting and/or confirming a proposed maintenance time provided by the analysis system 100. In the example of FIG. 3A, details regarding upcoming maintenance for the A/D Converter associated with maintenance event 210 (FIG. 2) are illustrated. In this user interface, the proposed maintenance time is illustrated at 310, along with a maximum potential output gain 320 and maintenance task requirements 330. The maintenance task requirements 330 indicate quantity of personnel needed for the maintenance task, and in other embodiments may include further details, such as a parts list, tools list, and the like.

The maintenance scheduler 340 includes a forecasted value graph depicting expected value of the asset during a time period that precedes an expected failure event of the asset (e.g., ranging from a small decrease in value of the asset to complete failure of the asset, depending on the implementation). In this example, an optimal repair time 342 is indicated as a time when predicted value of the asset is minimal. In one embodiment, this optimal repair time 342 is automatically selected by the analysis system and is used in scheduling the maintenance event unless the user overrides by selecting another maintenance time. For example, the scheduler may be aware of circumstances that are not optimal for performance of the repair during the optimal repair time 342, so may select another time for the maintenance event where value is also minimized, such as late Thursday, January 10 or early Friday, June 11, for example. In one embodiment, the user may select a time slot for the recommended maintenance task by clicking on the graph the desired maintenance task time. In some embodiments, the maintenance scheduler 340 may include information regarding other assets within a set of assets, such as overall value of the set of assets. For example, a second time series may be shown on the graph to indicate overall value of the set of assets, which may also be useful by the analysis software and/or user in selecting an optimal repair time for the asset, such as to minimize impact on the overall value of the set of assets.

The forecasted value, such as is illustrated in the maintenance scheduler 340, may be calculated based on several factors, such as expected inputs or conditions of the asset, dynamic value information for the asset, and the like. For example, dynamic value information may indicate an expected value of an asset over life of the asset, such as may be provided by the asset manufacturer to illustrate how the assets output, efficiency, failure risk, etc. changes over the asset's lifetime.

Additionally, in some embodiments a performance curve or performance model for a particular asset may be used to calculate an expected value (e.g., an expected performance metric of the asset) based on an expected future input of condition of the asset. For example, an asset that is affected by ambient temperature may be associated with a performance model that is usable to calculate the value of the asset for a given ambient temperature. In one example, electronic assets may operate optimally within a particular temperature range, while tapering downward as temperatures decrease or increase outside of that particular temperature range. Thus, a performance model may be used by the analysis system 100, along with expected temperature forecasts, to predict forecasted value of the asset, such as at expected temperatures during daytime hours versus nighttime hours and/or during warmer seasons versus cooler seasons, for example. Additionally, the forecasted value may take into account impact on not only the asset to be repaired or replaced, but on other assets that may provide inputs and/or receive outputs from the asset. The maximum potential output gain 320 may be calculated based on dynamic value information for the replacement (or repaired) asset to indicate an expected benefit that may be achieved by completing the recommended maintenance task.

Figure 3B:
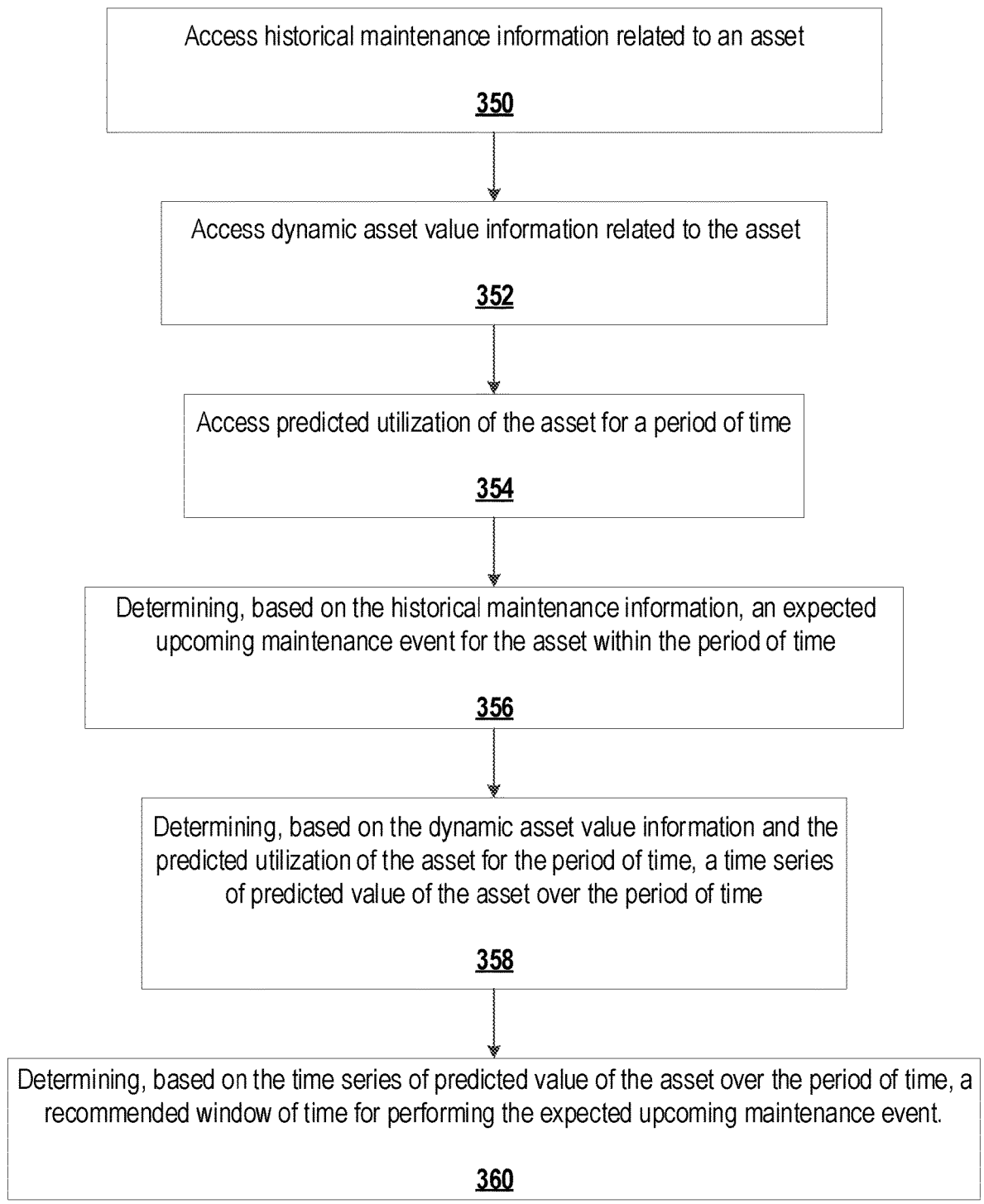
FIG. 3B is a flowchart illustrating one embodiment of a method of providing recommended time slot for maintenance events.

FIG. 3B is a flowchart illustrating one embodiment of a method of providing recommended time slot for maintenance events. In some embodiments, the method of FIG. 3B may be performed by the analysis system 100, while in other embodiments another computing system may partially or entirely perform the example method. Depending on the embodiment, the method may include fewer or additional blocks and/or the blocks may be performed in an order different than illustrated.

The example method of FIG. 3B describes determination of maintenance events in a scheduling window for a single asset; however, a similar method may be performed for multiple assets, such as a group of assets that are each within a set of assets and/or assets that are selected by the user.

The method begins at block 350, where the analysis system accesses historical maintenance information related to an asset. For example, maintenance data 124 (FIG. 1) that includes maintenance events associated with a particular asset, as well as related assets may be accessed. Related assets may include other assets within a set of assets and/or other assets having similar characteristics to the asset.

Next, at block 352, the analysis system accesses dynamic asset value information related to the asset. For example, value data 122, which may include a value model for a particular asset (e.g., a particular type, model, size, year, etc. of asset) may be usable to calculate an expected output of the asset relative to an input of the asset, where the output of the asset is indicative of value of the asset.

Moving to block 354, the analysis system accesses predicted utilization of the asset over a period of time. For example, sensor data 120 (FIG. 1) that may include actual, forecasted, and/or predicted sensor values, inputs and/or utilization levels of the assets (which may be accessed, e.g., via one or more API calls) may be accessed. Predicted utilization of the asset may be expressed in terms of a predicted performance metric of the asset (e.g., output volume based on predicted inputs to the asset), predicted value of the asset (e.g., based on predicted output of the asset), and/or other metrics.

Next, at block 356, the analysis system determines, based on the historical maintenance information, an expected upcoming maintenance event for the asset within the period of time. For example, historical maintenance data from the particular asset and/or a set of assets with some characteristic in common with the particular asset (e.g., assets within a particular geographic area, having the same capacity, size, capability, etc., and/or assets within a set of assets) may be analyzed to identify typical failure events (and/or associated maintenance events) for particular types or categories of assets and/or component or subsystem of assets. This failure and/or maintenance data may be used to predict the upcoming maintenance event for the selected asset.

At block 358, the analysis system determines, based on the dynamic asset value information, a time series of predicted value of the asset over the period of time. For example, the analysis system may calculate a forecasted value graph depicting expected value of the asset during a time period that precedes an expected failure event of the asset (e.g., ranging from a small decrease in value of the asset to complete failure of the asset, depending on the implementation). The predicted value of the asset at future times may be based on the predicted utilization of the asset and/or the value data associated with the asset.

At block 360, the analysis system determines, based on the time series of predicted values of the asset over the period of time, a recommended window of time for performing the expected upcoming maintenance event. For example, the window of time may include a time when the expected value of the asset is minimized.

Figure 4:
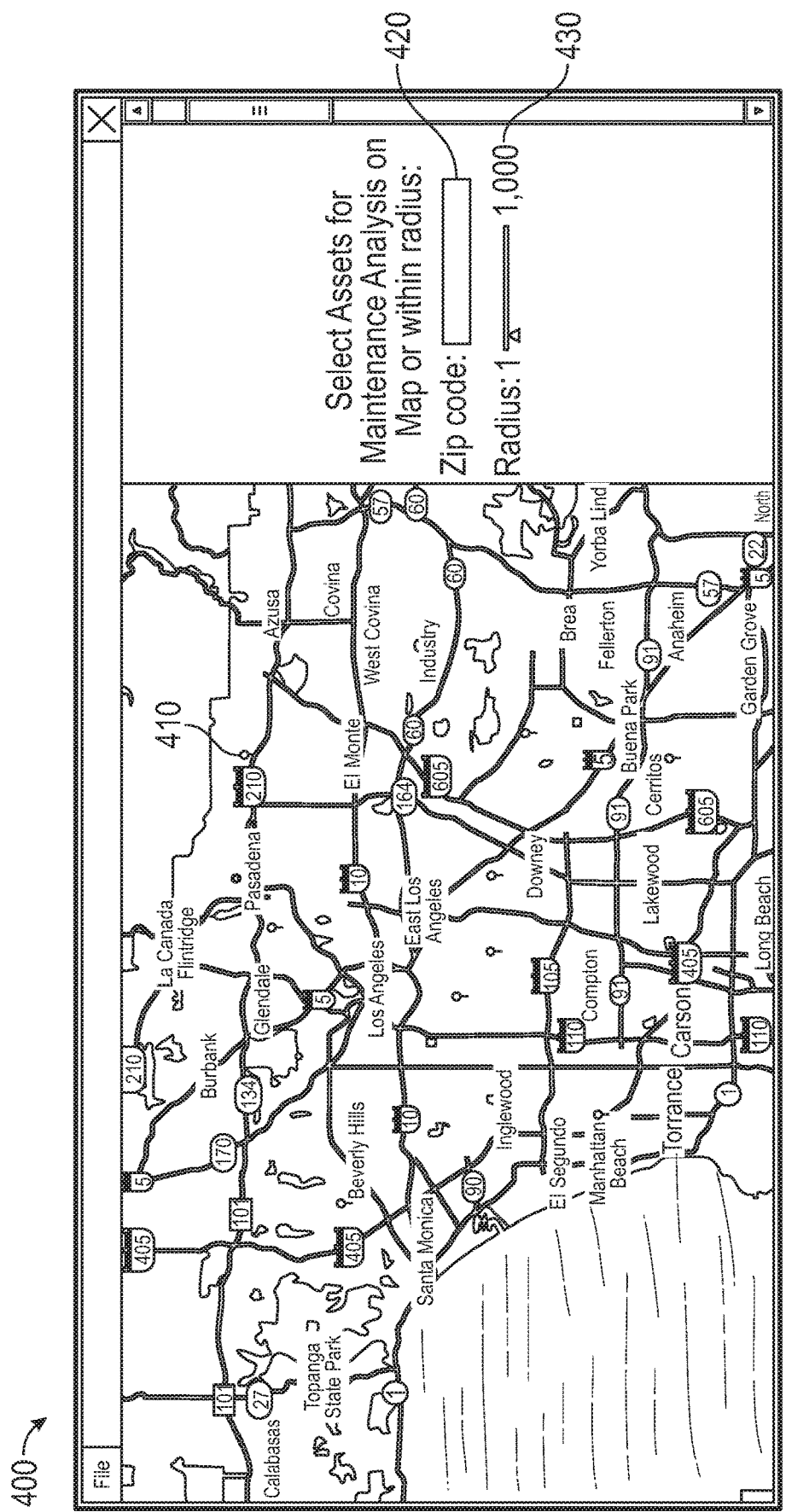
FIG. 4 illustrates a maintenance area selection user interface that is usable to select an area for which the analysis system will determine upcoming maintenance events.

FIG. 4 illustrates a maintenance area selection user interface 400 that is usable to select an area for which the analysis system 100 will determine upcoming maintenance events. In this example, a map is illustrated, including several pushpins 410 indicating locations of assets (or assets of a certain type, such as may be selected through filtering operations). Depending on the asset types and locations, the user interface may illustrate different visualizations of an asset system. For example, in some embodiments a blueprint or floorplan for a facility (e.g., a manufacturing facility) may be illustrated, such as from an image file that is proprietary to the facility.

In the example of FIG. 4, a user may select an area of the illustrated may by dragging and dropping a selection area (e.g., a circle or rectangle) on an area of the map. Similarly, the user may provide a ZIP Code in the entry box 420 and a desired radius 430 of a selection area. Additionally, the user may select particular asset by clicking on the pushpin 410 and/or other representation of the assets. Once an area is selected, the analysis system performs a maintenance event identification process, such as to determine one or more upcoming maintenance events for assets in the selected area.

Figure 5:
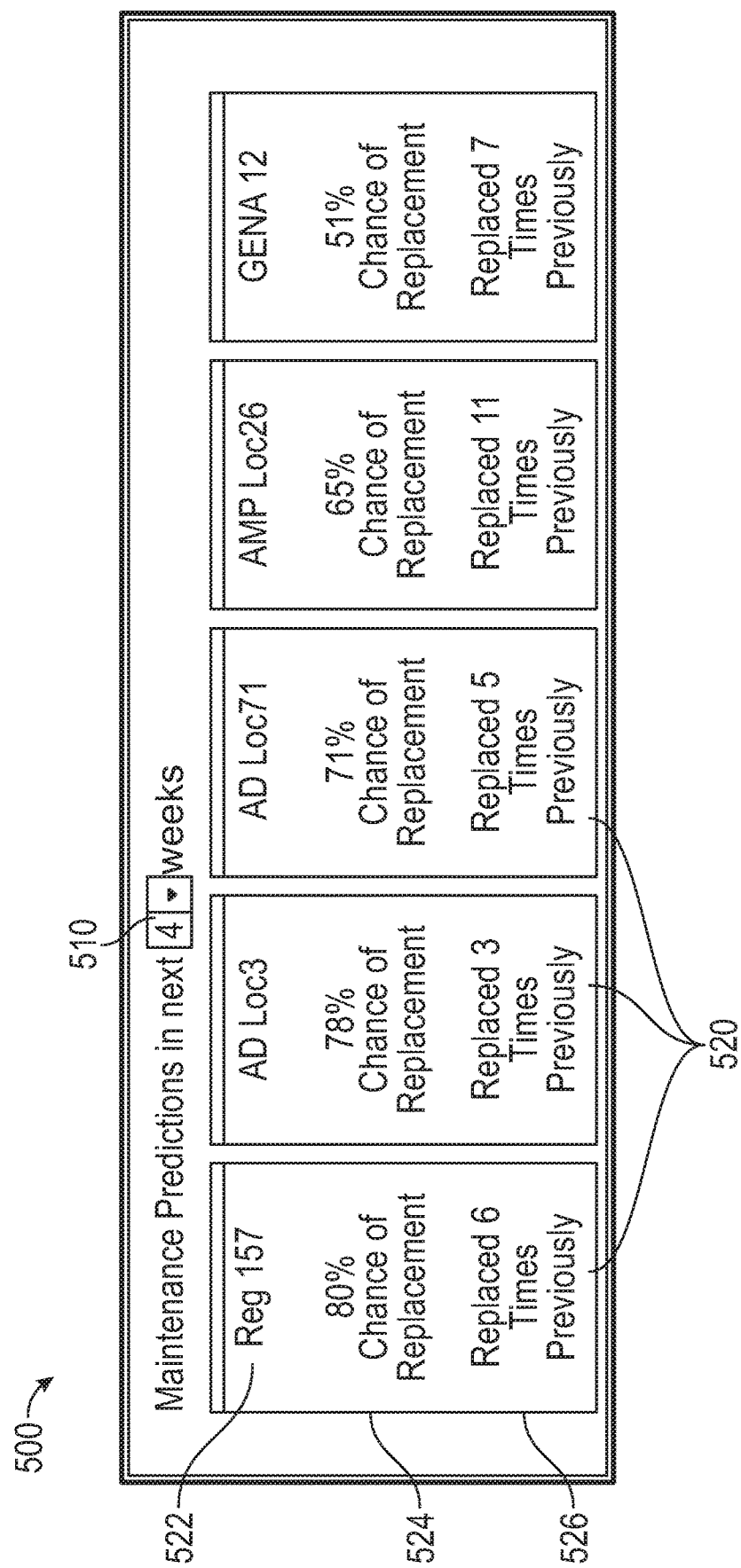
FIG. 5 is a maintenance prediction user interface illustrating predictions for upcoming maintenance events for a group of selected assets.

FIG. 5 is a maintenance prediction user interface 500 illustrating predictions for upcoming maintenance events for a group of selected assets. In one embodiment, a selection user interface, such as interface 400 (FIG. 4) may be used to select a group of assets for which maintenance predictions are provided in the prediction user interface 500. In other embodiments, assets may be selected in any other manner.

In the example of FIG. 5, a time window selection tool 510 is usable to select a timeframe for which maintenance tasks are displayed. In this example, each of the maintenance tasks 520 indicates an asset identifier 522, a replacement estimate 524, and a historical replacement indicator 526. The replacement estimate 524 may indicate a likelihood of failure, or significant decreased value, of the asset. In the example of FIG. 5, the recommended maintenance tasks are sorted to show those having the highest chance of replacement first (on the left), so that a user may prioritize efforts to implement maintenance tasks that are most likely to be necessary. In some embodiments, the user can select one of the maintenance events to request further information regarding the maintenance event, such as details similar to those illustrated in FIG. 3A.

Value Simulator

In some embodiments, the data analysis system 100 is configured to combine and analyze data from multiple assets to enable generation of useful and efficient predictions of value of a set of geographically dispersed assets based on one or more assumptions. For example, the data analysis system 100 may provide simulation data 172 that includes an interactive graphical user interface by which a user may enter assumptions such as a type of an asset and a possible geographical location for the asset, such as with reference to others of a set of assets. The data analysis system 100 may then predict or simulate a value of the asset and/or the overall set of assets over a period of time (e.g., a number of weeks or years). These simulations may take into account historical maintenance information (e.g., for assets in or around the geographical locations), the dynamic asset value information (e.g., for assets in or around the geographical locations), and/or the forecasted or predicted inputs or value of the assets (e.g., for assets in or around the geographical locations).

Figure 6:
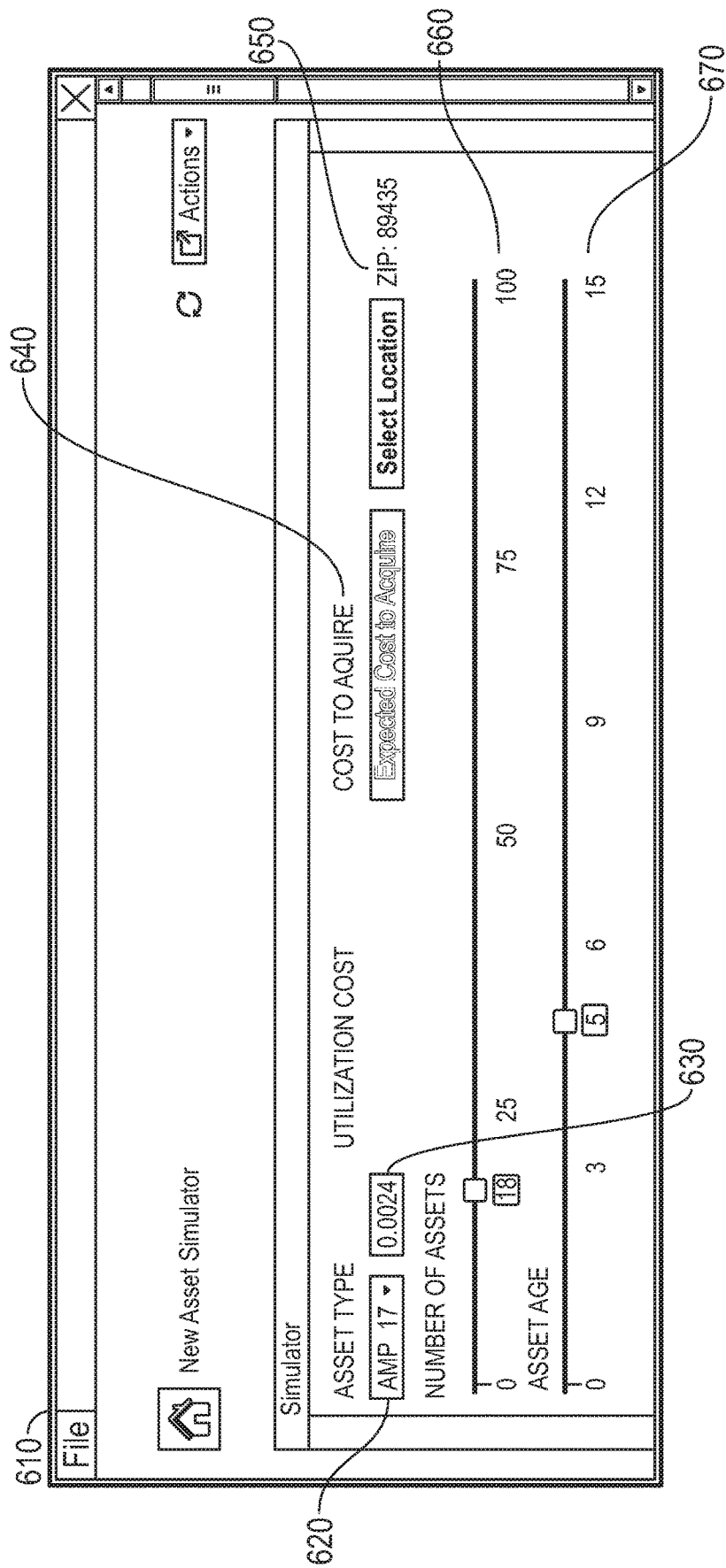
FIG. 6 illustrates an example simulation user interface that is usable to simulate addition of one or more new asset to a set of assets and/or to simulate an entirely new set of assets.

FIG. 6 illustrates an example simulation user interface 600 that is usable to simulate addition of one or more new asset to a set of assets and/or to simulate an entirely new set of assets. In this example embodiment, the simulator user interface 600 includes an asset selection interface 620, a utilization cost interface 630, a cost to acquire interface 640, a location interface 650, a quantity selector 660, and an asset age selector 670. In other embodiments, additional and/or fewer simulation parameters may be used by a simulation component.

In the example of FIG. 6, the asset selection interface 620 may allow selection of assets similar to those already in a set of assets and/or that are compatible with assets already in a set of assets. For example, in a telecommunication system, antennas having certain transmission, reception, power, etc. capabilities that are the same or similar to antennas already in the telecommunications system may be selectable via the asset selection interface 620. In some embodiments, once an asset is selected using asset selection interface 620, a utilization cost is populated in cost interface 630 based on known information on the selected asset. For example, historical utilization cost of similar assets, such as within the set of assets that are similar, may be analyzed to determine the expected utilization cost. In some embodiments, the user may provide the expected utilization cost in the cost interface 630. In this example, the user is also provided with a cost to acquire interface 640, wherein the user can supply an expected acquisition cost of the asset. A planned location of the asset may be selected using location interface 650 to identify a planned location for the asset. In some embodiments, the location is automatically populated with a location previously selected by the user, such as within an area selected using an interface similar to discussed above with reference to FIGS. 4. The example user interface 600 allows the user to select a number of the selected asset to add to the set of assets (or to use in creating a new set of assets) using quality selector 660, and provide an age of the asset using the asset age selector 670. The value simulator may then calculate and provide information regarding expected value of addition of the asset(s) to the set of assets, such as using interfaces similar to those discussed below with reference to FIG. 7, for example.

Value Tools

In some embodiments, the data analysis system 100 is configured to combine and analyze data from multiple assets to enable generation of useful and efficient indications of value losses (or gains) of a set of geographically dispersed assets. For example, the data analysis system 100 may provide value analysis data 176 (FIG. 1) including information regarding actual present value and/or future expected value of an asset (or set of assets) compared to a potential present value and/or future expected potential value of the asset (or set of assets).

Figure 7:
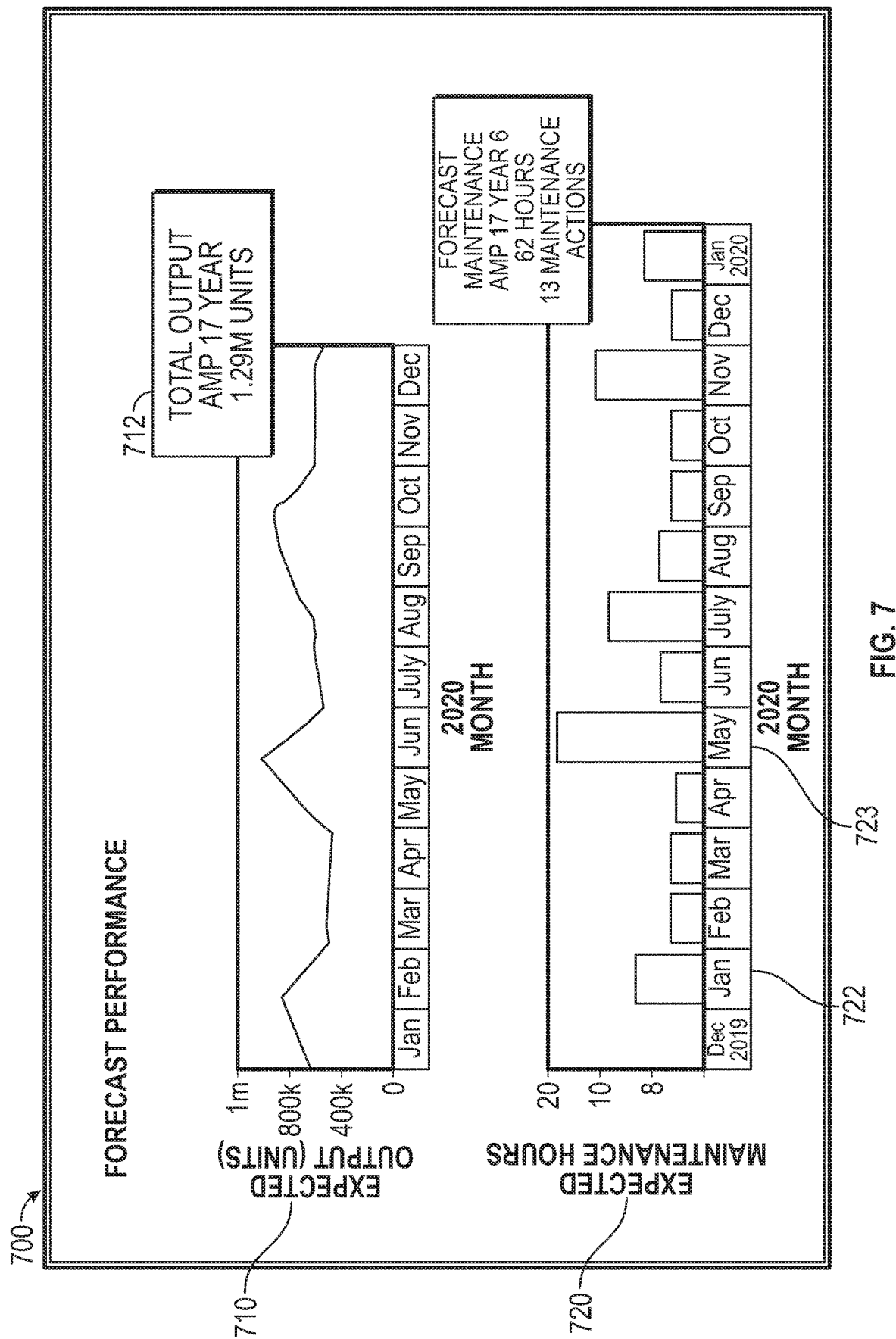
FIG. 7 is an example forecast performance user interface that illustrates an expected output chart and an expected maintenance hours chart.

FIG. 7 is an example forecast performance user interface 700 that illustrates an expected output chart 710 and an expected maintenance hours chart 720. Output and maintenance information, such as illustrated in FIG. 7, may be provided for the current asset or assets and/or a hypothetical asset or assets (e.g., that may be selected using a simulation interface such as in FIG. 6). In this example, expected output graph 710 indicates expected output for the "AMP 17" assets over a one year period, such as the 18 AMP 17 assets selected for simulation in FIG. 6. As discussed elsewhere herein, value of an asset may represent various performance metrics associated with the asset, which may be based on dynamic value information associated with the asset and corresponding expected input and/or conditions that affect value of the asset. In the embodiment of FIG. 7, value of the assets is converted into expected output. Value of the assets may vary from month to month, such as is shown in the example expected output chart 710. In this example, a total output 712 is also provided, indicating an increase in output in a first year after adding the assets.

The expected maintenance hours chart 720 provides a high-level view of expected maintenance on the selected assets (e.g. the asset selected as part of a simulation for asset selected for maintenance tasks). In the example of FIG. 7, expected maintenance tasks for each month are aggregated to indicate a total quantity of maintenance hours for each month. Thus, with reference to the example of adding 18 new AMP 17 assets selected in simulator 600, if two of those assets are expected to each require four hours of maintenance in January 2020, the January maintenance indicator 722 indicates that eight hours of total maintenance are expected for the new asset. The predicted maintenance hours for the same type of assets may be distributed based on probability data, similar to the chance of replacement information 524 provided in FIG. 5. For example, if each of the 18 assets are identical and there is a 60% chance in month four, 70% chance in month five, 75% chance in month six, 80% chance in month seven, and 90% chance in month eight of failure of the asset, the proposed maintenance schedule may be configured to distribute maintenance times of the 18 assets across multiple months in accordance with the selected probability of failure. In some embodiments and/or for certain assets, similar asset repairs may be more efficient when done concurrently. In such an embodiment, the proposed maintenance schedule may determine overlapping maintenance times for multiple assets.

In some embodiments, the user may interact with charts of FIG. 7, such as to initiate rescheduling of maintenance tasks to further maximize value of the assets. For example, a user may select maintenance indicator 723 in order to receive options for moving some of the 19 hours of maintenance tasks for May 2020 to another month, given the relatively high expected output for that month. In one embodiment, the maintenance may be automatically shifted to other months, such as to February, March, and/or April 2020, by the analysis system 100 in view of lower expected output for those months. In some embodiments, expected maintenance hours illustrated in chart 720 are already factored into expected output chart 710. Thus, the calculated output loss associated with the expected maintenance hours may be deducted from output figures for the assets to provide an expected output figure that takes into account the expected maintenance of those assets.

Figure 8:
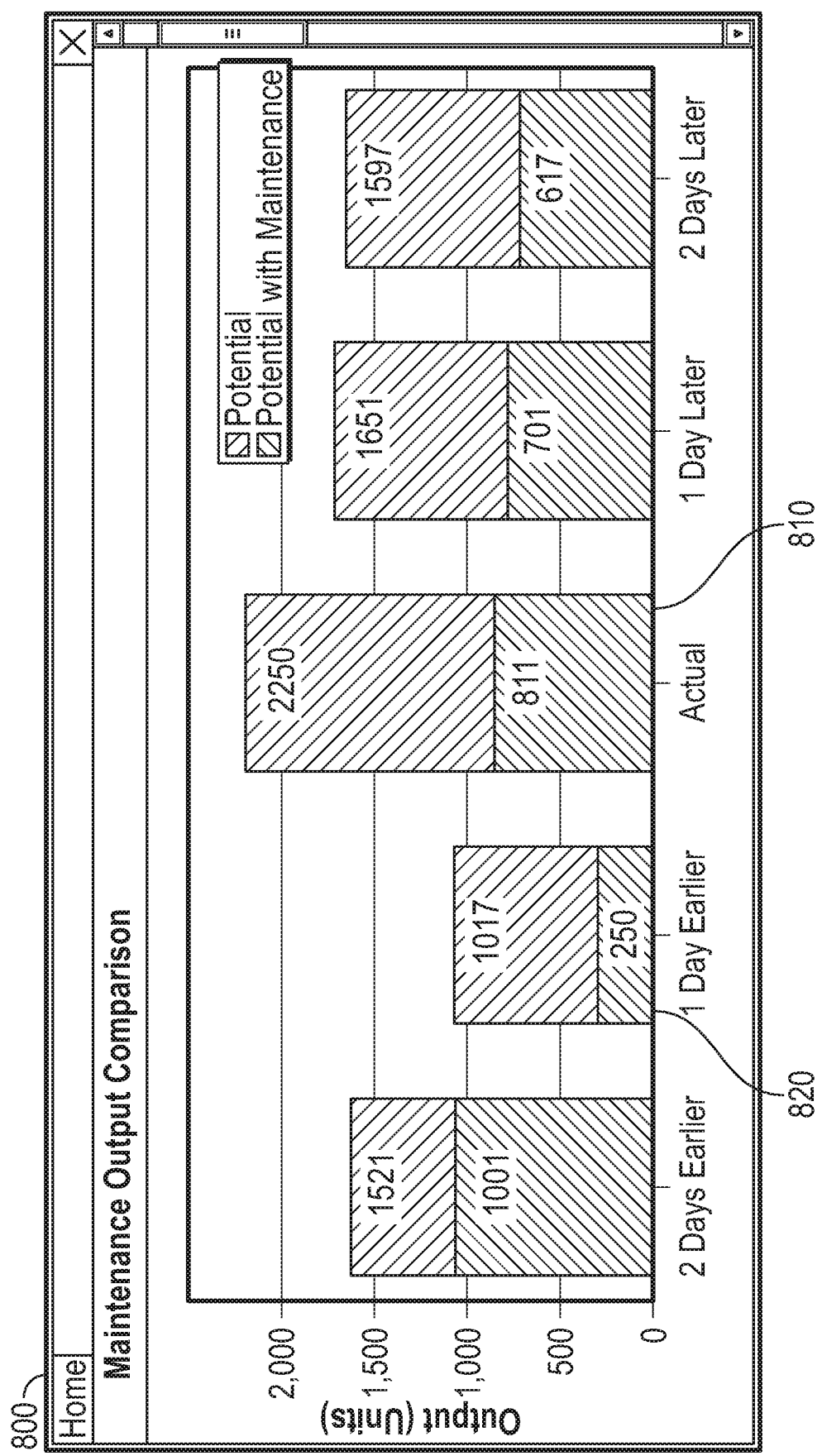
FIG. 8 provides an output comparison user interface that illustrates, for one or more selected asset, potential output for multiple possible maintenance times.

FIG. 8 provides an output comparison user interface 800 that illustrates, for one or more selected asset, potential output for multiple possible maintenance times. Information similar to that illustrated in FIG. 8 may be provided for an asset that has already been maintained and/or for assets that have not yet been maintained and/or are being analyzed as part of a simulation for possible implementation. In the example of FIG. 8, output is indicated on the vertical access, but in other embodiments any other performance metric(s) may be shown such as total output, production, efficiency, throughput, etc.

The sample user interface 800 indicates that for a proposed (or actual past) maintenance date 810, the expected output of the system increases from 811 units to 2250 units. If the maintenance tasks is moved to maintenance date 820, one day earlier, the expected output of the system drops to 1,017 units with performance of the maintenance. In this example, the expected output may include output over a time period greater than one day, such as one week, one month, for one year. Thus, the visualization allows the user to quickly identify how adjustments to the maintenance schedule might impact output over that time period.

Figure 9:
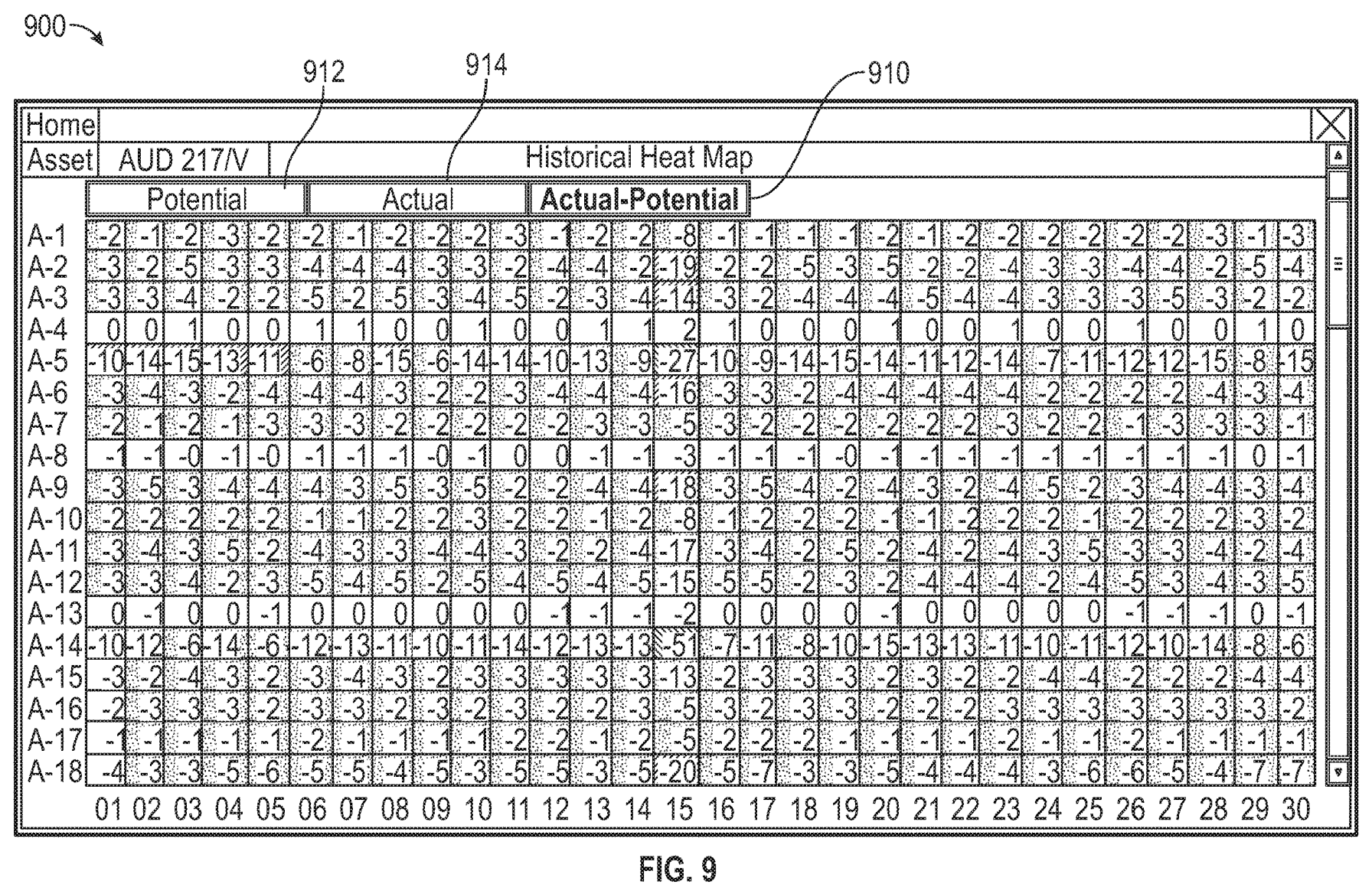

FIG. 9 is a value comparison user interface 900 that includes an interactive graphical user interface including a cell-based grid, where each cell of the grid indicates, for each asset, and for each day over a period of days (or other time period), a value capacity of the assets. In one embodiment, value capacity is a difference between an actual or realized value of the asset and a potential value of the asset. The potential value of the asset may be determined based on an analysis of value data from similar assets and/or other related data. The cells of this example user interface may be individually selectable to drill down, via the interactive graphical user interface, to view further details regarding the represented value capacity, such as technical details regarding errors, events, or other information related to the day and asset associated with a selected cell.

The user interface 900 indicates in a vertical axis 18 assets A-1 to A-18, and indicates days of a month along the horizontal axis. With the value capacity button 910 selected, each of the cells in the grid indicates actual value of the associated assets on the associated day minus potential value of that asset on the associated day. The cell is then colored based on the resultant value, such that a heat map of cells with values that are higher (or lower) than median values stand out more in the visualization. In this embodiment, the user may select a potential value button 912 to update the display to show potential value of each of the assets in the grid or may select an actual value button 914 to display actual value of the assets in the grid.

Alerts and Notification

In some embodiments, the data analysis system 100 may provide alerts and/or other notifications to entities having an interest in generation and/or updates to maintenance events. For example, an alert may provide a real-time notice to a client (e.g., via user device 180 of FIG. 1) that a new maintenance event has been identified. In some embodiments, alerts may be automatically transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Example Computing System Architecture and Operation

Figure 10:
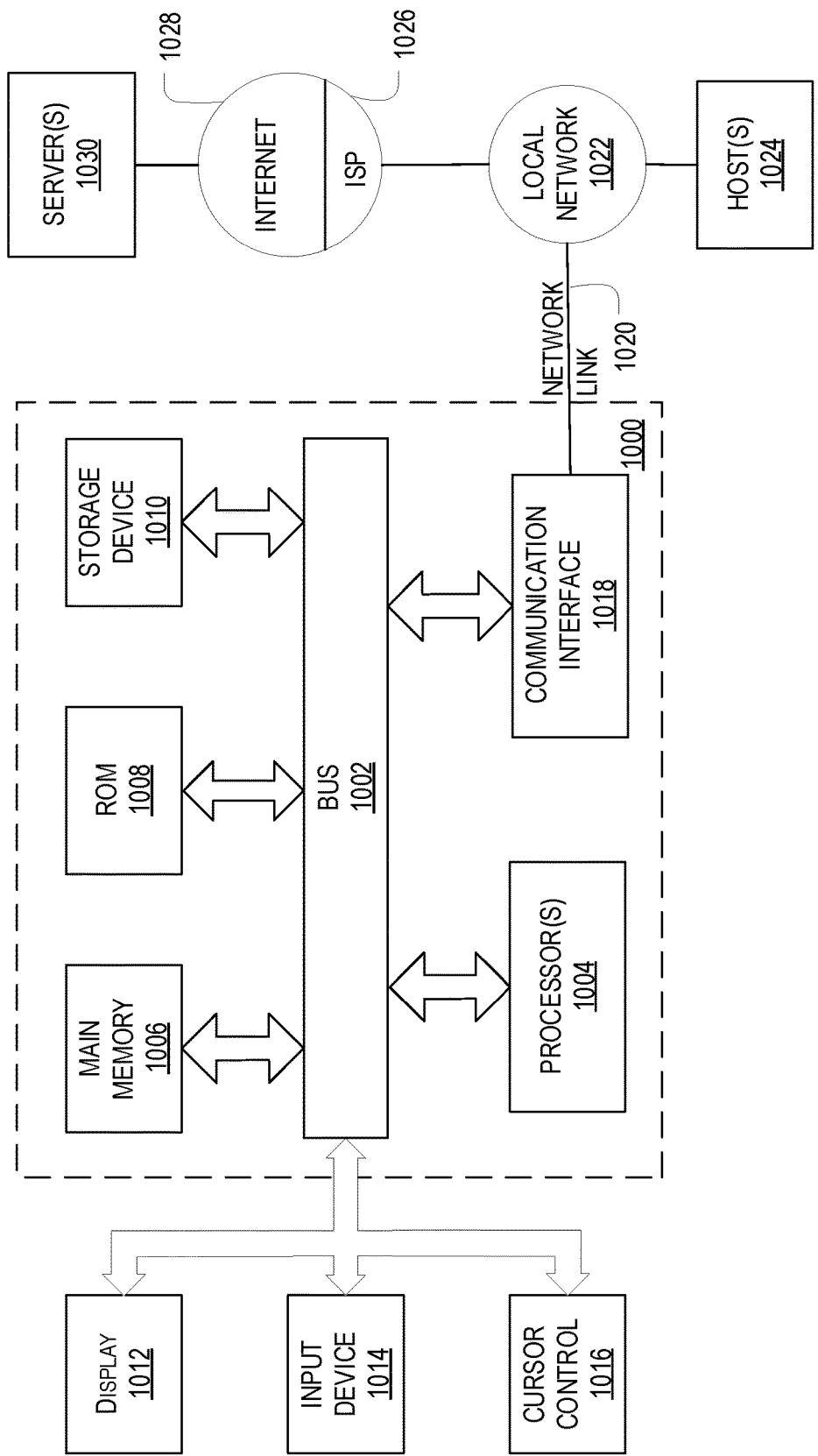
FIG. 10 illustrates a computer system with which certain methods discussed herein may be implemented.

FIG. 10 illustrates a computer system 1000 with which certain methods discussed herein may be implemented. For example, the data analysis system 100 and/or the user device 180 may include some, all, or additional components as discussed below with reference to system 1000.

Computer system 1000 includes a bus 1002 or other communication mechanism for communicating information, and a hardware processor, or multiple processors 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 106, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:
    accessing historical maintenance information related to an asset;
    accessing dynamic asset value information related to the asset;
    accessing a predicted utilization of the asset for a period of time;
    determining, based on the historical maintenance information, an expected upcoming maintenance event for the asset within the period of time;
    determining, based on the dynamic asset value information and the predicted utilization of the asset for the period of time, a time series of predicted value of the asset over the period of time;
    determining, based on the time series of predicted value of the asset over the period of time, a recommended window of time for performing the expected upcoming maintenance event; and
    generating user interface data renderable to display an interactive graphical user interface including a time series graph representative of the determined time series of predicted value, wherein the interactive graphical user interface is configured to receive an input from a user selecting a portion of the time series graph; and
    scheduling the maintenance event at a time associated with the selected portion of the time series graph.

2. The computerized method of claim 1, wherein the predicted utilization is based on expected values of an input to the asset over the period of time.

3. The computerized method of claim 2, wherein the dynamic asset value information includes a dynamic value model and the predicted utilization is further based on evaluation of the expected values of the input to the asset by the dynamic value model.

4. The computerized method of claim 1, wherein the historical maintenance information includes one or more documents in an image format, the method further comprising:
    performing character recognition of the one or more documents; and
    parsing information in the one or more documents to identify maintenance events.

5. The computerized method of claim 4, further comprising:
    for each identified maintenance event, generating a maintenance event object.

6. The computerized method of claim 5, further comprising:
    identifying two or more related maintenance events; and
    determining one or more of:
        an interval between the related maintenance events;
        one or more asset types impacted by the maintenance events; and
        an average time for completion of the maintenance events.

7. The computerized method of claim 1, further comprising:
    generating the dynamic asset value information based on sensor data from one or more sensors on the asset.

8. The computerized method of claim 1, wherein the dynamic asset value information indicates variance in a performance metric of the asset based on an input value.

9. The computerized method of claim 8, wherein the performance metric is an output quantity or rate of the asset.

10. The computerized method of claim 9, wherein a second performance metric is a value of the asset that is determined based at least on the output quantity or rate of the asset.

11. The computerized method of claim 1, wherein the recommended window of time is large enough to accommodate the expected upcoming maintenance event based on average time for completion of similar maintenance events in the historical maintenance information.

12. The computerized method of claim 1, wherein the recommended window of time is during a lowest predicted value of the asset.

13. The computerized method of claim 1, wherein the recommended window of time is during less preferred times.

14. The computerized method of claim 1, wherein the graphical user interface indicates the recommended window of time.

15. A computing system comprising:
    a hardware computer processor;
    a non-transitory computer readable medium having software instructions stored thereon, the software instructions executable by the hardware computer processor to cause the computing system to perform operations comprising:
    accessing historical maintenance information related to an asset;
    accessing dynamic asset value information related to the asset;
    accessing a predicted utilization of the asset for a period of time;
    determining, based on the historical maintenance information, an expected upcoming maintenance event for the asset within the period of time;
    determining, based on the dynamic asset value information and the predicted utilization of the asset for the period of time, a time series of predicted value of the asset over the period of time;
    determining, based on the time series of predicted value of the asset over the period of time, a recommended window of time for performing the expected upcoming maintenance event; and
    generating user interface data renderable to display an interactive graphical user interface including a time series graph representative of the determined time series of predicted value, wherein the interactive graphical user interface is configured to receive an input from a user selecting a portion of the time series graph; and scheduling the maintenance event at a time associated with the selected portion of the time series graph.

16. The computing system of claim 15, wherein the predicted utilization is based on expected values of an input to the asset over the period of time.

17. The computing system of claim 16, wherein the dynamic asset value information includes a dynamic value model and the predicted utilization is further based on evaluation of the expected values of the input to the asset by the dynamic value model.

18. The computing system of claim 17, wherein a second performance metric is a value of the asset that is determined based at least on the output quantity or rate of the asset.

* * * * *